No. 667,360. Patented Feb. 5, 1901.
T. H. BRIGG.
POLE HEAD DEVICE FOR CARRIAGES.
(Application filed Apr. 10, 1900.)
(No Model.)
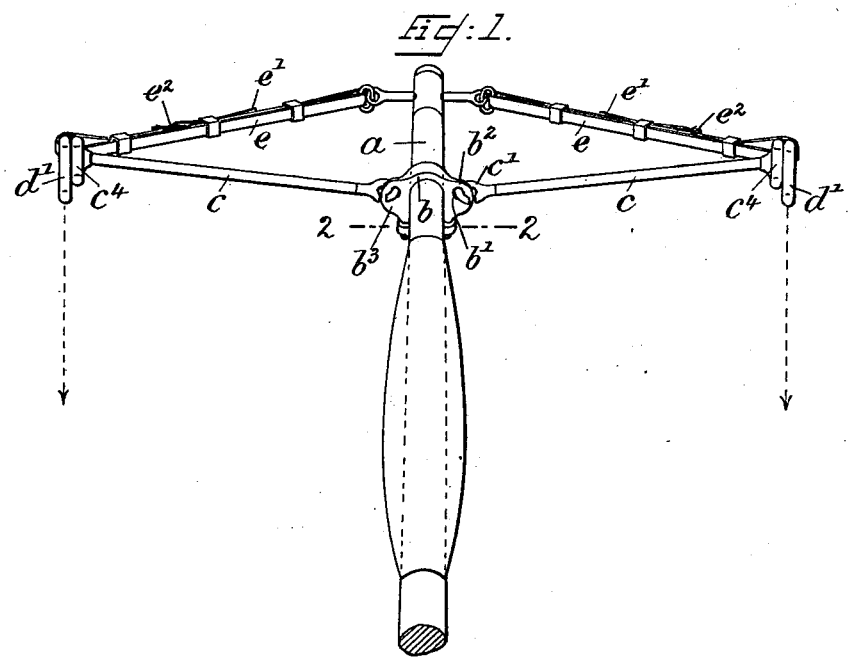
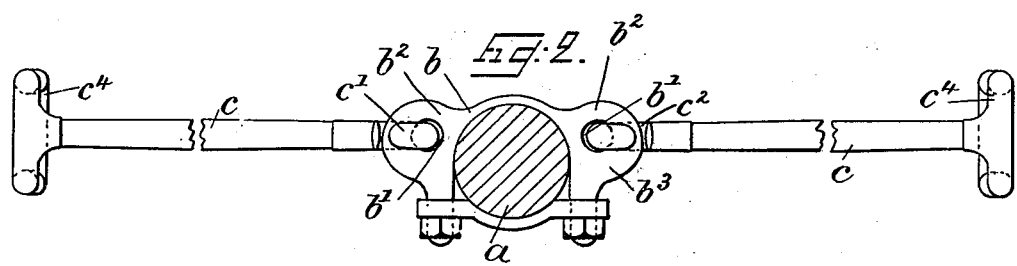
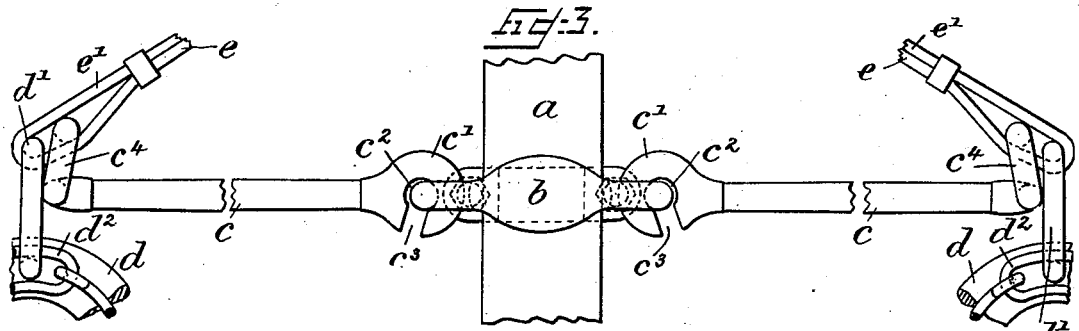

UNITED STATES PATENT OFFICE.

THOMAS HARGREAVES BRIGG, OF LONDON, ENGLAND, ASSIGNOR OF SEVEN-TWENTIETHS TO CHARLES WILLIAM WALKER, OF BRADFORD, ENGLAND.

POLE-HEAD DEVICE FOR CARRIAGES.

SPECIFICATION forming part of Letters Patent No. 667,360, dated February 5, 1901.

Application filed April 10, 1900. Serial No. 12,283. (No model.)

*To all whom it may concern:*

Be it known that I, THOMAS HARGREAVES BRIGG, a subject of the Queen of Great Britain and Ireland, and a resident of London, England, have invented a certain new and useful Improvement in Pole-Head Devices for Carriages and other Vehicles, (for which I have filed applications for patents in Great Britain September 15, 1899, and in France March 15, 1900;) and I do hereby declare the following to be a full, clear, and exact description of the same.

This invention relates to an improved pole-head attachment for carriages and other vehicles drawn by two or more draft-animals abreast, and is designed to cause such animals, both when pulling and when backing or stopping the vehicle, to exert their power in planes parallel with each other and with the pole between them, and consequently without liability of side slip and to the best advantage. To this end the device is characterized by a pair of spreader-arms, respectively connected in a separable manner and with freedom of movement to a carrier applied to the pole-head, and respectively adapted to connect with the draft-animals' collars in the planes of the animals' centers and connected therewith by pole chains or straps, each so adapted as to connect the spreader-collar and chain or strap together or to release the same at one operation.

On the accompanying drawings, Figure 1 represents the appliance in perspective view. Fig. 2 is a sectional elevation through 2 2, Fig. 1; and Fig. 3 is a plan of Fig. 2.

$a$ represents the vehicle-pole, which adjacent to its fore end is fitted with a carrier $b$, having two eyes $b'$, formed with a less thickness of metal at one part $b^2$ than at an opposite part $b^3$.

$c$ represents the spreader-arms, each of which has a hooked end $c'$ formed with a center $c^2$ sufficiently large to freely engage with the thickest part of the eye $b'$ to permit of its freedom of movement and with a contracted mouth $c^3$ capable of engaging only with the thinnest part $b^2$ of the eye $b'$ to permit of its engagement and disengagement only when occupying a certain relative position. Each spreader-arm is made of a sufficient length to extend from the carrier to the center of the draft-animal's collar $d$ on the same side of the pole when harnessed to the vehicle, and is formed at such end with a loop $c^4$, or may be fitted with a link by which it is connected to the collar. This connection is effected by a pole chain or strap $e$, the end $e'$ of which is passed through the loop or link $c^4$ and through a ring $d'$ on the kidney-link $d^2$ of the collar-hame $d$, and is doubled back and hooked or buckled to the chain or strap at $e^2$.

The described connection of each spreader-arm, collar, and pole chain or strap enables such parts to be coupled when assembled by simply fastening the chain or strap end and to be uncoupled by simply unfastening the chain or strap end, and the described connection of the carrier and each spreader-arm secures such parts in connection when in action and allows of their ready connection and disconnection when out of action upon bringing the arm into such a position as will allow the arm and mouth $c^3$ to pass the carrier-eye part $b^2$, and the whole combination serves to cause the animals, both when pulling and when backing or stopping, to be kept apart and to work in planes parallel with each other and with the pole.

What I claim as my invention, and desire to secure by Letters Patent, is—

The combination with a carriage-pole of a carrier secured thereto a short distance from the end of the pole and having on each side of the pole an eccentrically-formed eye having a less thickness of metal at one part than at an opposite part, spreader-rods each having a hooked end formed with a center sufficiently large to engage with the thickest part of the eye and with a contracted mouth capable of engaging with the thinnest part of the eye and by which the same are removably secured each to one of the eyes of the carrier and having an outer looped or linked end, and chains or straps connected to the pole and adapted to connect the outer ends of the spreader-rods and the animals' collars in the planes of the animals' pull and resistance, as and for the purpose set forth.

In testimony whereof I have signed this specification in the presence of two subscribing witnesses.

THOMAS HARGREAVES BRIGG.

Witnesses:
 CHARLES AUBREY DAY,
 ALFRED CHARLES DAY.